Sept. 16, 1969   J. D. McCALLISTER ET AL   3,466,695
TABLET CLEANING APPARATUS
Filed June 22, 1967
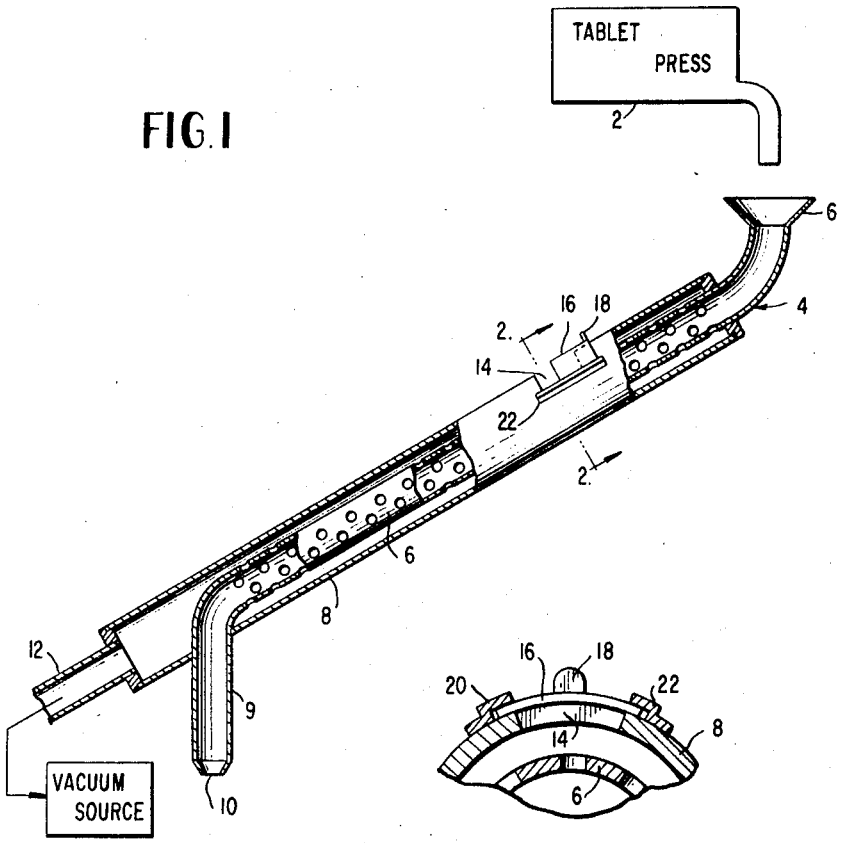
INVENTORS
J. DAVID McCALLISTER
ALLEN M. McMATH
DARWIN A. ANDERSON
BY Browne, Schuyler & Beveridge
ATTORNEYS

United States Patent Office 3,466,695
Patented Sept. 16, 1969

3,466,695
TABLET CLEANING APPARATUS
Joseph David McCallister, Iowa City, Allen M. McMath, West Branch, and Darwin Arthur Anderson, Coralville, Iowa, assignors to the State of Iowa for the use and benefit of the University of Iowa, Iowa City, Iowa, an educational institution of Iowa
Filed June 22, 1967, Ser. No. 648,013
Int. Cl. B08b 5/04; A47l 9/02
U.S. Cl. 15—306                               7 Claims

ABSTRACT OF THE DISCLOSURE

Apparatus for removing dust from medicinal tablets or other small articles includes an inclined tablet-carrying tube opened to the atmosphere at its opposite ends. The tube has a perforated section which is enclosed within an evacuated housing. Air enters the housing from the ends of the tube to create an air flow axially of the tube and radially through the perforated section. An adjustable opening in the wall of the housing permits regulation of the degree of vacuum therewithin.

---

This invention relates to apparatus used for removing dust and foreign particles from relatively small articles such as tablets which have been discharged from a conventional tablet press.

The prior art has recognized the desirability of removing dust and foreign particles from tablets made by usual tablet pressing or forming machines. Removal of the dust not only prevents the interior of tablet bottles from becoming clouded, but it saves persons handling the tablets from the nuisance of the dust which clings to the tablets.

Previous equipment used for removing dust from tablets has, like the present invention, involved the application of a vacuum within a chute which carries the tablets from the forming press to the bottles. United States Patent 2,595,226 discloses such a chute in which a lower wall is perforated and connected to a vacuum chamber. This prior art apparatus, however, also includes means located directly adjacent to the vacuum ports for introducing air under positive pressure, so that there is no significant flow of gas along an axis longitudinally aligned with the chute. In addition to complicating the apparatus somewhat, the provision of the positive pressure jets limits the effective area of the chute through which the dust-laden air may be exhausted.

An evacuated inclined chute is also employed in the apparatus shown by U.S. Patent 2,617,137 to Alexander Bodnar. This prior art device involves a vertical chute with a pair of interiorly located inclined foraminous baffles. A vacuum is drawn from immediately beneath one of the baffles. In this apparatus, there is no appreciable flow of gas parallel to the movement of tablets as they tumble across the baffles, nor is there any flow of dust-laden gas radiating in all directions from the path of the tumbling tablets.

In brief summary, the present invention relates to an inclined chute for small articles which has a perforated portion surrounded by an evacuated housing. The chute which preferably is tubular has at least one end in communication with the atmosphere so that the pressure differential between the end of the chute and the perforated section of the chute will induce a flow of air which moves both axially of the chute, parallel to the path of movement of the tablets, and radially outwardly through the perforated portion of the chute to discharge any dust dislodged during movement of the tablets through the apparatus.

In order to control the degree of vacuum surrounding the perforated portion of the chute, the evacuated housing which may be tubular and coaxial with the chute is provided with an aperture which is spaced from the chute and communicates with the atmosphere outside the housing. This aperture is at least partially obstructed by an adjustable closure member so that its effective size may be regulated in order to vary the degree of vacuum within the housing. Such regulation, in addition to affecting the amount of vacuum, will change the rate of travel of the tablets through the chute, and thus it may be used to control the cleanliness of the tablets which is determined by the length of time during which the tablets are located within the apparatus.

For an understanding of the invention, reference is made to the accompanying drawings which illustrate but one of numerous possible embodiments.

FIG. 1 is a parially sectional view taken in a vertical plane through the apparatus of the invention; and FIG. 2 is a sectional view taken along the line 2—2 in FIG. 1, illustrating the construction of the variable obstruction which vents the housing to the atmosphere.

In FIG. 1, it will be seen that the apparatus receives tablets from the tablet press diagrammatically illustrated at 2. The inlet opening of the tubular tablet chute 4 includes a funnel portion 6 which intercept tablets falling from the press. A perforated portion 6 of the chute is inclined from the horizontal and is enclosed by a tubular housing 8. The lower portion of the chute 4 is an unperforated vertical portion 9 which extends outside the housing 8 and terminates at its lower end in an outlet opening 10.

The housing 8 is substantially closed from the atmosphere and is connected at its lower end to a conduit 12 which leads to a pump or other suitable vacuum source. The creation of a vacuum within the housing 8 will, of course, result in the flow of air axially of the chute 4 and radially outwardly in all directions through the apertures in the perforated portion 6 of the chute. This combination of axial and radial flow during the period when a tablet is tumbling through the chute provides for a most efficient removal of dust particles which cling to the surface of the tablet.

The housing 8 is provided near its upper end with an opening 14 which communicates between the interior of the housing and the ambient atmosphere. The opening 14 is partially obstructure by a valve member 16 which has an upstanding handle portion 18. The valve member 16 is slidable axially in the trackways 20 and 22 as illustrated in FIG. 2.

The manner in which the apparatus operates is evident from the foregoing description. Tablets discharged by the press 2 enter the funnel 6 and are directed through the chute 4 into the perforated section 6 within the housing 8. The orientation of the perforated portion 6 is such that the tablets move therethrough under the influence of gravity. During this movement, the tablets tumble due to their movement and due to the gaseous flow to produce a repeated series of impacts which serve to dislodge any dust adhering to their surfaces. The dust is loosened and carried away by the flow of air. The air flow is maintained continually, so that it moves both axially of the tablets during their movement through the perforated section 6, and radially outwardly in all directions from the tablets in order to carry away the dislodged dust particles.

The velocity of the tablets moving through the perforated section 6 is influenced both by gravity and by the extent of evacuation of the housing 8. The degree of evacuation of the housing 8 is a function of the output of the vacuum source connected at 12 and the amount to which the opening 14 is exposed to the atmosphere. Therefore, by sliding the valve member 16, an operator may adjust the effective size of the opening 14 to regulate the length of time during which tablets are exposed to the flow of gases. After passing through the perforated section 6, the tablets pass through the vertical section 9 of the tube and are discharged from the outlet opening 10 into a bottle or other suitable receptacle.

Of course, the apparatus of this invention may assume forms quite different from the single illustrative embodiment. The tubular perforated portion 6 of the chute 4 may be of wire mesh or perforated sheet material. It may have any suitable cross sectional shape and it may be inclined from the horizontal to any angle which provides the desired gravitational movement of the tablets.

We claim:

1. Apparatus for cleansing tablets, comprising, an inclined tubular chute for carrying tablets therethrough under the influence of gravity, said chute having an opening at its upper end for receiving tablets and an opening at its lower end for discharging tablets, said chute having a perforated section with apertures radiating in substantially all directions, a housing enclosing the perforated section, a vacuum source, conduit means connecting the vacuum source to the housing at a location axially spaced from the perforated section of the chute, whereby movement of gases is induced axially within said chute and radially outwardly through the apertures in the perforated section.

2. Apparatus according to claim 1 wherein the chute and the housing include concentric tubular bodies having circular transverse cross sections.

3. Apparatus according to claim 2 wherein the conduit means is connected to a lower portion of the housing, and the chute bends downwardly and passes outwardly through the housing at a location axially upwardly of the lower portion of the housing.

4. Apparatus according to claim 2 wherein the conduit means is connected to an end wall of the housing at a location concentric with the tubular bodies.

5. Apparatus according to claim 1 wherein the housing has a venting aperture spaced from the chute and communicating with the atmosphere exterior of the housing, and means for varying the effective size of the venting aperture to affect the degree of vacuum within the housing.

6. Apparatus according to claim 5 wherein the venting aperture in the housing is axially spaced from the location where the conduit means is connected.

7. Apparatus according to claim 6 wherein the conduit means is connected to a lower portion of the housing and the venting aperture is located at an upper portion of the housing.

References Cited

UNITED STATES PATENTS

| | | |
|---|---|---|
| 2,176,139 | 10/1939 | Lofgren. |
| 2,595,226 | 5/1952 | Cookson _____ 15—306.2 X |
| 2,597,807 | 5/1952 | Elliott _____ 15—306.1 |

ROBERT W. MICHELL, Primary Examiner

U.S. Cl. X.R.

15—419